Patented Aug. 21, 1945

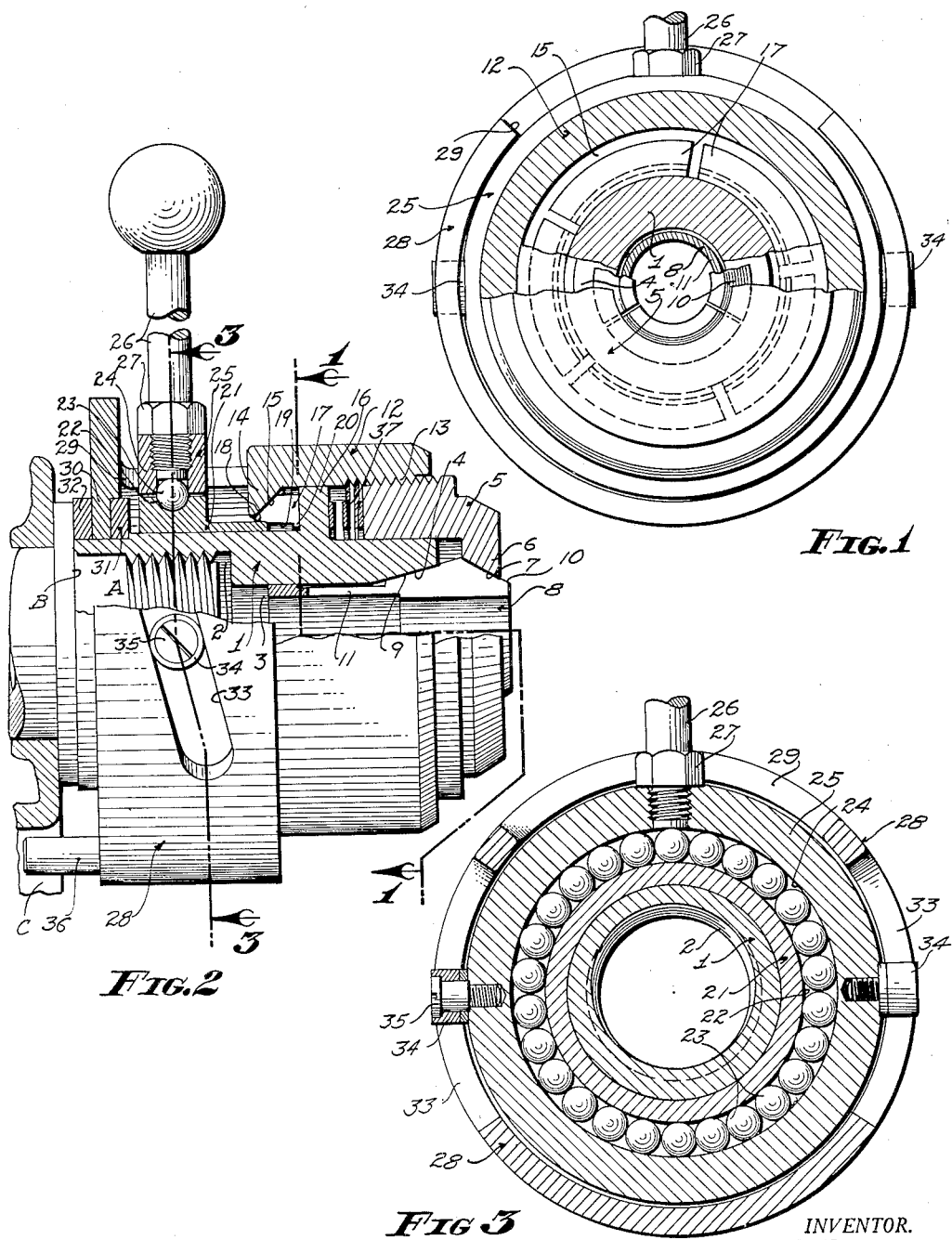

2,383,156

UNITED STATES PATENT OFFICE 2,383,156

COLLET CHUCK

Ellsworth B. Phillips, Los Angeles, Calif., assignor of fifty per cent to Florian Trinajstrich and fifty per cent to Ludwig Trinajstrich, both of Los Angeles, Calif.

Application February 28, 1944, Serial No. 524,318

6 Claims. (Cl. 279—50)

My invention relates to collet chucks and among the objects of my invention are:

First, to provide a collet chuck for lathes which enables the full diameter of the bore in the drive spindle of a lathe to be utilized; that is, the collet chuck is adapted to receive collets equal to the diameter of the spindle bore so that any work piece which is capable of passing through the spindle bore may be held in the collet chuck, thereby increasing the capacity of a given size lathe.

Second, to provide a collet chuck wherein the operating handle does not rotate, but is positioned in ready reach of the machinist who needs only to pull on the handle to tighten the collet and to push the lever to loosen the collet, this operation being possible whether or not the collet chuck is rotating, thereby providing a collet chuck which lends itself to quantity production requirements.

Third, to provide a collet chuck which incorporates a novel actuating device for tightening or loosening the collet, the actuating device being so arranged that, although the collet is rotating and the operating handle is stationary, no appreciable load is placed on the bearings contained in the collet chuck except when actually tightening or loosening the collet.

Fourth, to provide a collet chuck wherein the gripping force exerted by the collet may be regulated to suit the material being worked upon, so that a light force may be applied when gripping a thin tube or soft material, and a greater force may be applied when the collet is gripping hard surfaced materials; furthermore, when the collet chuck is adjusted for a given material a large number of work pieces may be held in succession in the collet chuck with assurance that the same force will be applied each time.

Fifth, to provide a collet chuck wherein the collet is caused to contract quickly from an expanded to an intermediate contracted position and then more slowly contract the remaining amount until the work piece is firmly held.

With the foregoing and other objects in view as may appear hereinafter, reference is directed to the accompanying drawing, in which:

Figure 1 is a partial sectional, partial front elevational view of the collet chuck taken along the line 1—1 of Figure 2.

Figure 2 is a partial longitudinal, partial side elevational view of the collet chuck.

Figure 3 is a transverse sectional view of the collet chuck taken through 3—3 of Figure 2.

The collet chuck is designed to be mounted on the headstock spindle of a lathe, indicated by A in Figure 2. A mandrel 1 is provided with an internally threaded spindle socket 2 in one end which screws onto the end of the spindle A. The mandrel 1 projects from the spindle and is provided with a collet bore 3 which is flared or tapered, as indicated 4, at its extended end.

A nose ring 5 fits slidably and rotatably upon the forward or extended end of the mandrel and is provided with an internal flange 6 which overhangs the extremity of the mandrel. The radially inner periphery of the flange 6 is tapered as indicated by 7, in opposition to the tapered portion 4. The slope of the tapered portion 7 is preferably greater than that of the tapered portion 4. A collet 8 having complementary tapered portions 9 and 10 which are engaged by the tapered portions 4 and 7 fits in the mandrel 1. A stem 11 extends axially into the bore 3 from the tapered portion 9 of the collet. The collet is split longitudinally for part of its length forming segments which contract radially inwardly when the tapered portions 4 and 7 are forced toward each other.

An actuator ring 12 fits around the mandrel 1 and continues axially rearward from the nose ring toward the spindle A. The actuator ring is connected with the nose ring by grip adjustment threads 13, the function of which will be described in more detail hereinafter. The extended or rear end of the actuator ring is provided with an internal flange 14, the radially inner periphery of which is beveled to form a cam face 15, the slope of which is relatively steep, about 45% has been found satisfactory. The mandrel 1 is provided with an external flange 16 located between the flange 14 and the nose ring 5, which forms with the flange 14 an annular pocket in which are placed arcuate cam segments 17. The cam segments have external cam faces complementary to the cam face 15 of the flange 14, and are provided with internal tapered faces 18 and 19. The tapered face 18 begins at the axially inner or rear extremity of each cam segment and converges forwardly, joining with the tapered face 19 which continues to a small stop flange 20 located at the forward, radially inner corner of the cam segment. The forward sides of the cam segments abut the rear side of the external flange 17. The slope of the tapered face 18 may be about 5%, whereas the slope of the tapered face 19 may be about 3%, although, it should be understood that other slopes may be used.

The portion of the mandrel 1 rearwardly from the flange 18 forms a bearing portion for a sleeve 21. The forward portion of the sleeve is relatively thin walled so as to fit within the cam segments 17, bear against the tapered faces 18 and 20 and expand the cam segments radially outward as the sleeve is moved forwardly on the mandrel. Radially outward movement of the cam segments causes axially inward or rearward movement of the actuator ring 12 and nose ring 5 so as to contract the collet 8 between the tapered portions 4 and 7.

The sleeve 21 is provided with a ball race 22 in which ride balls 23 covered by an outer race 24 forming the inner surface of a control ring 25. The control ring 25 is provided with a handle 26 which extends radially therefrom and may be screwthreaded into a radial hole in the control ring through which the balls 23 may be introduced. A lock nut 27 secures the handle 26.

A shell 28 covers the control ring 25 except for a slot 29 which accommodates the handle 26. The shell 28 is provided with an internal flange 30 at its rear end which fits the mandrel 1 between a shoulder, designated B, provided on the spindle A and the control ring 25. Thrust bearings 31 and 32 are located between the flange 30 and the shoulder B and control ring 25 respectively. The thrust bearings may be merely rings of brass or similar bearing material, or may be ball thrust bearings. The loads imposed are nominal and only momentary, consequently, simple rings as shown have proven satisfactory. They are pressed on the mandrel, the flange 30 riding freely between them.

The shell 28 is provided with a pair of diametrically disposed, helically extending cam slots 33, and the control ring 25 is provided with cam rollers 34 which fit therein and are held by journal pins 35. The shell 28 is anchored against rotation by any suitable means such as a pin 36 extending into the headstock, designated C. Thus, arcuate movement of the handle 26 causes a proportional axial movement of the sleeve 21 as the cam rollers ride in the slots 33.

Operation of the collet chuck is as follows:

When the sleeve 21 is in its rear position, its forward or axially outer end clears the cam segments 17 so that they occupy their radially inner positions; consequently, the actuator ring 12 and nose ring 5 are in their forward positions and provide sufficient space between the tapered portions 4 and 7 to enable the collet to expand clear of the work piece. The collet itself may have sufficient spring to take up the slack between the parts, particularly those associated with the cam segments; however, a spring 37 may be interposed between the flange 18 and the axially inner end of the nose piece 5.

When the handle 26 is moved toward the operator (to the left in Figures 1 and 3) the sleeve 21 forces the cam segments radially outward, causing, through the action of the cam face 15, axial inward movement of the tapered portion 7 to tighten or contract the collet 8.

It should be noted that no loads are imposed on the ball bearing comprising races 22 and 24 and balls 23, nor on the thrust bearings 31 and 32. The slopes of the tapered radially inner faces of the cam segments 17, particularly the cam face 18, are such that there is an insufficient force component available to move the sleeve 21 rearwardly in response to the radial compression of the cam segments 17. As a consequence, the sleeve 21 stays in any position in which it is placed even after force exerted through the cam slots 33 and 34 has been relieved and the handle 26 is freed.

The slight axial play inherent in the ball bearing enables the pressure between the cam rollers 34 and cam slots 33 to be relieved when the handle is freed. Thus, there is no axial thrust on either bearing 31 or 32 by the flange 30 as long as no torque is applied to the control ring 25 through its handle 26. Only when the collet is being tightened is there pressure on the thrust bearing 31, and only when the collet is being loosened is there pressure on the thrust bearing 32.

It is, of course, desirable that the sleeve 21 be in engagement with the tapered portion 18 when the collet is fully tightened on the work. This is made possible by the grip adjustment threads 13, the nose ring 5 being turned in or out to regulate the spacing between the tapered portions 7 and 4 for a given position of the sleeve 21.

Though I have shown and described a certain embodiment of my invention, I do not wish to be limited thereto, but desire to include all novelty inherent in the appended claims.

I claim:

1. A collet chuck, comprising: a tubular mandrel adapted to be mounted on a lathe spindle; a sleeve structure slidable on said mandrel and including an internal flange overhanging the end thereof; means incorporating said flange and end of said mandrel for radially compressing a collet positioned therebetween upon axial movement of said sleeve onto said mandrel; cam segments mounted around said mandrel and within said sleeve structure and movable radially outward to cause said axial movement of said sleeve; a spreader ring axially slidable between said mandrel and said cam segments to urge said segments radially outward; an actuator ring; a thrust bearing between said actuator ring and said spreader ring; a housing around said rings, and fixed against rotation; and helically arranged cam and rider means connecting said housing and actuator ring to effect longitudinal movement of said actuator ring and spreader ring upon arcuate movement of said actuator ring.

2. A collet chuck, comprising: a rotatable mandrel adapted to be mounted on the headstock spindle of a lathe; a housing mounted around said mandrel and fixed against rotation; thrust bearings interposed between said housing and mandrel to permit application of loads on said housing directed axially with respect to said mandrel; an actuator structure including an inner ring slidable on said mandrel, an outer ring within said housing, and a thrust bearing between said rings; helical cam and rider means therefor incorporating said outer ring and housing and arranged to cause axial movement of said rings relative to said mandrel upon arcuate movement of said outer ring; and means for securing a collet in the extended end of said mandrel including a collet constricting member and means operatively connecting said constricting member with the inner ring of said actuator structure.

3. A collet chuck, comprising: a rotatable mandrel adapted to be mounted on the headstock spindle of a lathe; a housing mounted around said mandrel and fixed against rotation; thrust bearings interposed between said housing and mandrel to permit application of loads on said housing directed axially with respect to said mandrel; an actuator structure including an inner ring slidable on said mandrel, an outer ring within said housing, and a thrust bearing between said rings; helical cam and rider means therefor incorporating said outer ring and housing and arranged to cause axial movement of said rings relative to said mandrel upon arcuate movement of said outer ring; said inner ring having an axial extension; cam segments surrounding said axial extension, there being tapered faces incorporated in the coacting portions of said axial extension and cam segments to effect radial expansion of said cam segments upon axial movement of said inner ring; a sleeve slidable on said mandrel and overhanging the extended end of said mandrel; collet constricting means incorporating the end of said mandrel and the overhanging end of said sleeve operable to constrict a collet upon axial movement of said sleeve; and means for translating radial movement of said cam elements to axial movement of said sleeve.

4. The combination with a collet chuck which includes a mandrel, a sleeve slidable thereon, overhanging the end thereof and forming therewith a collet constricting means operable upon axial movement of said sleeve, and radially movable cam elements engageable with said sleeve to effect said axial movement, of an actuating mechanism therefor, comprising: an inner ring slidable axially on said mandrel and rotatable therewith, said inner ring being engageable with said cam elements to effect radial movement; an outer ring mounted on said inner ring; a thrust bearing therebetween; a member fixed against rotation extending over said outer ring; a cam and rider incorporating said fixed member and said outer ring to impart axial movement of said outer and inner rings through said thrust bearing upon arcuate movement of said outer ring with respect to said fixed member.

5. The combination with a collet chuck which includes a mandrel, a sleeve slidable thereon, overhanging the end thereof and forming therewith a collet constricting means operable upon axial movement of said sleeve, and radially movable cam elements engageable with said sleeve to effect said axial movement, of an actuating mechanism therefor, comprising: an inner ring slidable axially on said mandrel and rotatable therewith, said inner ring being engageable with said cam elements to effect radial movement; an outer ring mounted on said inner ring; a thrust bearing therebetween; a housing fixed against rotation and having a flange within which said mandrel rotates; thrust bearings between said flange and said mandrel; said housing including a cylindrical portion extending over said outer ring and having arcuate slots therein; and cam riders carried by said outer ring and extending into said slots whereby arcuate movement of said outer ring causes axial movement of said inner ring to actuate said cam elements.

6. A collet chuck comprising: a mandrel adapted to be mounted on the spindle of a lathe; forward and rearward partially telescoping sleeves mounted on said mandrel; dual wedging cam elements interposed between said sleeves and engaging the telescoping portions thereof, the engaging portions between said cam elements and forward sleeve being capable of reversible wedging action, and the engaging portions between said cam elements and said rearward sleeve having a non-reversible wedging action, whereby axial loads may be transmitted from the rearward to the forward sleeve, but not from the forward to the rearward sleeve; said forward sleeve overhanging said mandrel and forming therewith a collet constricting means responsive to axial movement of said forward sleeve; a thrust bearing for said rearward sleeve, permitting rotation thereof on said mandrel and including a race adapted to be moved arcuately while said sleeve is rotating; a housing fixed against rotation; and helical cam means and cam riders therefor connecting said race and housing whereby arcuate movement of said race causes a corresponding axial movement thereof transmittible through said thrust bearing to said rearward sleeve.

ELLSWORTH B. PHILLIPS.